(12) United States Patent
Matsuda (10) Patent No.: US 7,281,121 B2
(45) Date of Patent: Oct. 9, 2007

(54) PIPELINE PROCESSING DEVICE AND INTERRUPT PROCESSING METHOD

(75) Inventor: Takayuki Matsuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 300 days.

(21) Appl. No.: 10/854,146

(22) Filed: May 27, 2004

(65) Prior Publication Data
US 2005/0005086 A1    Jan. 6, 2005

(30) Foreign Application Priority Data
Jul. 4, 2003 (JP) ............. 2003-271096

(51) Int. Cl.
G06F 7/499 (2006.01)
(52) U.S. Cl. ............ 712/220; 712/220; 712/214; 712/211
(58) Field of Classification Search ........ 712/220, 712/214, 211
See application file for complete search history.

(56) References Cited
U.S. PATENT DOCUMENTS 5,675,807 A * 10/1997 Iswandhi et al. ......... 710/260
5,854,908 A * 12/1998 Ogilvie et al. ........... 710/312
5,881,296 A * 3/1999 Williams et al. ......... 710/263
6,125,443 A * 9/2000 Takahashi ............... 712/244
2001/0049763 A1 * 12/2001 Barry et al. ............. 710/264

OTHER PUBLICATIONS

Patterson et al, Computer Organization & Design, 1998, Morgan Kaufmann, 2nd Edition, 476-489, 678.*
Patterson et al, Computer Organization &Design, 1998, Morgan Kaufmann, 2nd Edition, A-34-35.*
Patterson and Hennessy "Computer Organization & Design" Second Edition, Nikkei Business Publications, Inc., 1999 (Discussed on p. 1 of the specification).

* cited by examiner

Primary Examiner—Donald Sparks
Assistant Examiner—Vincent Lai
(74) Attorney, Agent, or Firm—Posz Law Group, PLC

(57) ABSTRACT

At an MA stage, data, such as a header address of an interrupt processing routine, is loaded via a data bus and immediately supplied to a program counter via multiplexers without the intervention of an instruction decode stage in accordance with a setting address outputted from an EXE/MA buffer to an address bus. Thus, at the next processing timing at which the header address of the interrupt processing routine is loaded, the loaded header address is set in the program counter and fetching of a header instruction of the interrupt processing routine so that the interrupt processing routine can be immediately started.

5 Claims, 5 Drawing Sheets

PIPELINE PROCESSING DEVICE AND INTERRUPT PROCESSING METHOD

CROSS REFERENCE TO RELATED APPLICATION

This application is based upon, claims the benefit of priority of, and incorporates by reference the contents of Japanese Patent Application No. 2003-271096 filed on Jul. 4, 2003.

FIELD OF THE INVENTION

The present invention relates to a device and method for interrupt processing in a pipeline processing device.

BACKGROUND OF THE INVENTION

Conventionally, an information processing device that conducts pipeline processing (referred to below as "pipeline processing device") is known in which one instruction is divided into plural stages, processing of each stage is sequentially executed per set processing timing and processing of mutually different stages is concurrently executed at the same processing timing, whereby the plural instructions (instruction processing cycles comprising the plural stages) are processed in parallel to obtain an instruction result per processing timing (e.g., see David A. Patterson and John L. Hennessy, *Computer Organization & Design*, Second Edition, Nikkei Business Publications, Inc., 1999).

Here, as one example of this type of pipeline processing device, a CPU that conducts 5-stage pipeline processing by dividing one instruction into five stages comprising instruction fetch (IF), instruction decode (DEC), execute (EXE), memory access (MA) and write-back (WB) will be described using FIGS. 4 and 5.

Figure 4:
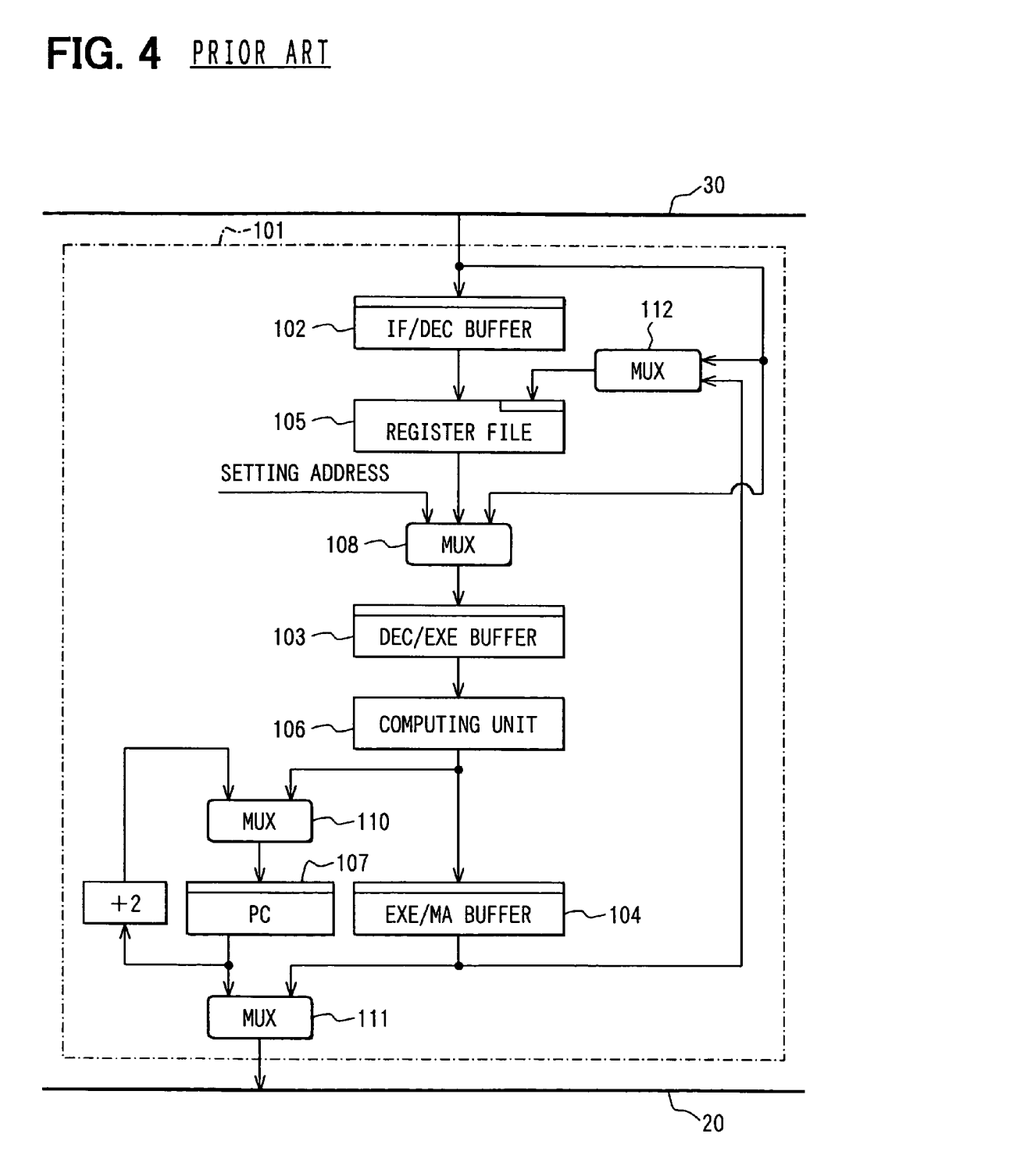
FIG. 4 is a block diagram showing the internal configuration of a conventional CPU.
Figure 5:
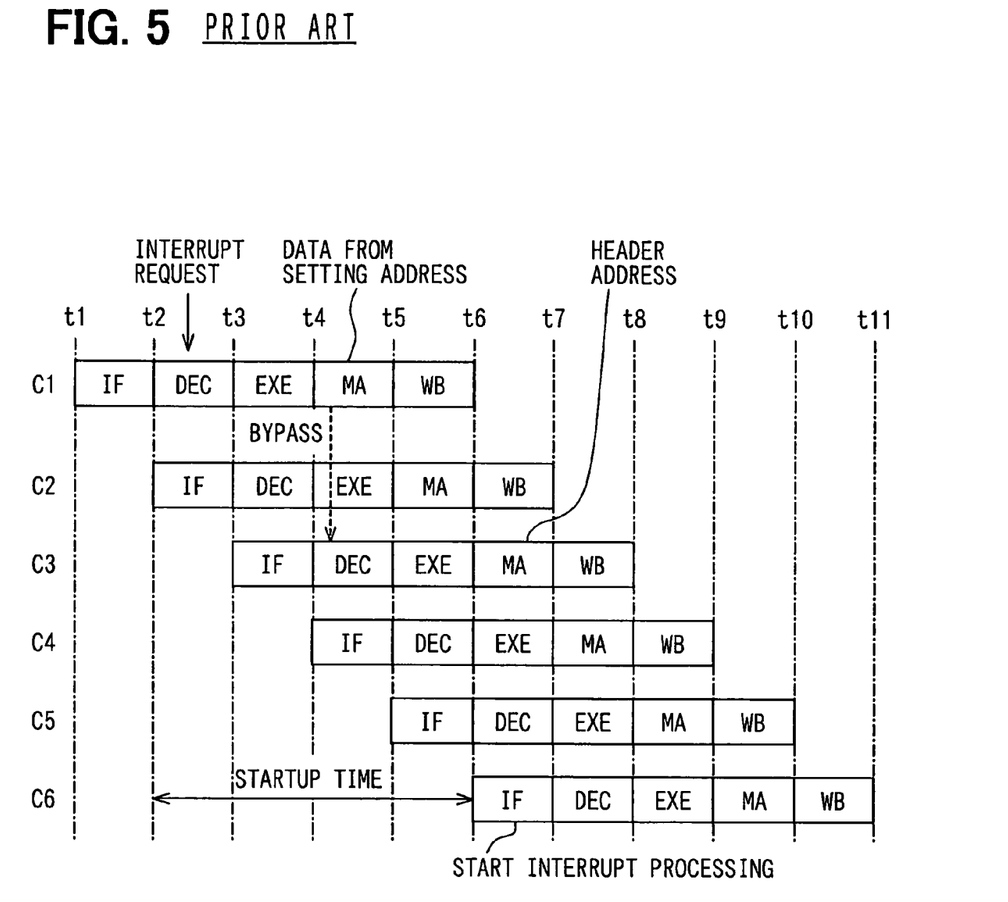
FIG. 5 is a timing diagram of a pipeline operation pertaining to the startup process of an interrupt processing routine of the conventional CPU.

FIG. 4 is a block diagram showing the configuration of a data path portion in the CPU, and FIG. 5 is a timing diagram for describing an operation when the CPU has received an interrupt request.

The CPU is one where an instruction is read from a memory (mainly a ROM) at the IF stage, the instruction read at the IF stage is decoded and a register is read at the DEC stage, and arithmetical and logical computation is conducted in response to the content of the instruction decoded at the DEC stage and an address of the instruction to be read by the IF stage and an address when accessing the memory are computed at the EXE stage. Moreover, the memory is accessed (i.e., data is read or written) at the MA stage using, as the address, the result of the computation at the EXE stage, and the result of the computation at the EXE stage or the data read from the memory at the MA stage is stored in an internal register at the WB stage.

As shown in FIG. 4, a CPU 101 is disposed with pipeline registers 102 to 104 that store data necessary at each stage, control information and the execution results of each stage.

Of these, the pipeline register 102 temporarily retains, as input data of the DEC stage, the instruction read at the IF stage. Below, the pipeline register 102 will be referred to as the IF/DEC buffer 102. The pipeline register 103 temporarily retains, as input data of the EXE stage, data necessary for computation at the EXE stage on the basis of the result of decoding at the DEC stage. Below, the pipeline register 103 will be referred to as the DEC/EXE buffer 103. Moreover, the pipeline register 104 temporarily retains, as input data of the MA stage, the result of the computation at the EXE stage. Below, the pipeline register 104 will be referred to as the EXE/MA buffer 104.

The CPU 101 is also disposed with a register file 105 comprising plural registers that store data loaded from the memory at the MA stage; a computing unit 106 that executes, on the basis of data prepared in the DEC/EXE buffer 103 at the DEC stage, arithmetical and logical computation and computation of an address of an instruction to be read at the IF stage and addresses when accessing the memory, i.e., processing of the EXE stages; and a program counter 107 for designating the address in which is stored the instruction to be read at the IF stage.

Moreover, the CPU 101 is also disposed with a multiplexer 108 that selects any of output from the register file 105, a ROM address (referred to below as "setting address") in which is stored information relating to a header address of an interrupt processing routine (referred to below as "interrupt address information") or data loaded from an external memory via a data bus 30 and provides this to the DEC/EXE buffer 103; a multiplexer 110 that selects any of output of the computing unit 106 and updated output where the output of the program counter 107 is counted up and renders this into input data of the program counter 107; a multiplexer 111 that selects any of output from the program counter 107 and output from the EXE/MA buffer 104 and outputs this to an address bus 20; and a multiplexer 112 that selects any of output from the EXE/MA buffer 104 and data loaded via the data bus 30 and supplies this to the register file 105.

It should be noted that, in addition to the above-described data path portion, the CPU 101 is also disposed with a control unit (not shown) that decodes the instruction fetched at the IF stage on the basis of data stored in the IF/DEC buffer 102 and, in accordance with the decoding result thereof, executes processing that reads data necessary for computation from the register file 105 and executes processing that switches the settings of the multiplexers 108 and 110 to 112.

The CPU 101 configured in this manner normally executes processing in the following sequence.

First, at the IF stage, an instruction is read from the address set by the program counter 107 and the instruction is stored in the IF/DEC buffer 102.

Next, at the DEC stage, decoding of the instruction stored in the IF/DEC buffer 102 is conducted and, in accordance with the decoding result thereof, data necessary at the EXE stage is prepared from within the register file 105 and the data is stored in the DEC/EXE buffer 103.

Next, at the EXE stage, the data prepared at the DEC stage is stored in the DEC/EXE buffer 103 and, on the basis of the stored data, the computing unit 106 executes computation designated in accordance with the result of the decoding at the DEC stage.

Next, at the MA stage, the result of the computation by the computing unit 106 is stored in the EXE/MA buffer 104 or the program counter 107. Then, in a case where the data is an address for memory access, the data stored in the EXE/MA buffer 104 is outputted to the address bus via the multiplexer 111. In a case other than this, the data stored in the EXE/MA buffer 104 is supplied in the register file 105 via the multiplexer 112.

Next, at the WB stage, the data stored in the EXE/MA buffer 104 or the data loaded from the address designed by that data is stored in the register file 105.

Thereafter, the processing of each stage is repeatedly executed in parallel.

Incidentally, numerous peripheral circuits are normally internally disposed in the microcomputer disposed with the CPU 101, and the interrupt processing routine must be executed in correspondence to interrupt requests from these peripheral circuits.

An operation when an interrupt processing routine corresponding to an interrupt request is started when an interrupt request has been received in this manner will be described using FIGS. 4 and 5.

As shown in FIG. 5, assuming that an interrupt request has been received at a stage starting at a processing timing t2, the multiplexer 108 immediately switches to a setting that supplies the setting address to the DEC/EXE buffer 103 in lieu of data supplied from the register file 105.

Thus, at the DEC stage of an instruction processing cycle C1, the instruction fetched at the IF stage of a processing timing t1, i.e., the instruction that is being stored in the IF/DEC buffer 102 at that point in time is nullified, and the setting address is transmitted to the EXE stage (DEC/EXE buffer 103) in lieu of the decoding result of the instruction.

Next, at a processing timing t3, the setting address is stored in the DEC/EXE buffer 103, and the computing unit 106 is set to allow the setting address stored in the DEC/EXE buffer 103 to pass without changing the value (specifically, zero may be added to the setting address or the logical product of the setting address and the data, all of whose bits are 1, may be determined).

Thus, at the EXE stage of the instruction processing cycle C1, the setting address is transmitted as is to the MA stage (EXE/MA buffer 104).

Next, at a processing timing t4, the setting address is stored in the EXE/MA buffer 104, the multiplexer 111 is set to output the output of the EXE/MA buffer 104 to the address bus 20, and the multiplexer 108 is set to supply, to the DEC/EXE buffer 103, the data loaded from the setting address of the memory via the data bus 30.

Thus, at the MA stage of the instruction processing cycle C1, memory access to the setting address is executed, and the data loaded thereby, i.e., the interrupt address information is stored in the DEC/EXE buffer 103.

In other words, the interrupt address information loaded at the MA stage of the instruction processing cycle C1 is bypassed to the DEC stage of an instruction processing cycle C3.

Next, at a processing timing t5, the interrupt address information is stored in the DEC/EXE buffer 103, the computing unit 106 is set to determine the header address of the interrupt processing routine on the basis of the interrupt address information stored in the DEC/EXE buffer, and the multiplexer 110 is set to supply the output of the computing unit 106 to the program counter 107 instead of the updated output of the program counter 107.

Thus, at the EXE stage of the instruction processing cycle C3, the header address of the interrupt processing routine is determined and this header address is supplied to the program counter 107.

Next, at a processing timing t6, the computation result (header address) of the computing unit 106 is stored in the program counter 107, the multiplexer 111 is set to output the output of the program counter 107 to the address bus 20, and the data (instruction) loaded from the header address via the data bus 30 is stored in the IF/DEC buffer 102.

Thus, the header address of the interrupt processing routine is set in the program counter 107 by the MA stage of the instruction processing cycle C3, and fetching of the instruction immediately begins in accordance with the setting value of the program counter 107.

In other words, the interrupt processing routine corresponding to the interrupt request received at the DEC stage beginning at the processing timing t2 begins at the IF stage beginning at the processing timing t6.

In this manner, the startup time required from the reception of the interrupt request to when the interrupt processing routine actually starts (here, the time corresponding to four stages from t2 to t6) is the time at which the processing to be executed is interrupted, and it is preferable to shorten this time as much as possible. In particular, with respect to microcomputers for controlling embedded devices where rapid accommodation with respect to interrupt requests is necessary, there are many microcomputers where the processing itself to be implemented with respect to the interrupt requests simply ends in a short time, but the interrupt requests arise frequently. In other words, the time consumed in order to start the interrupt processing routine occupies a large part of the entire processing, and the length of the startup time thereof ends up exerting a large affect on the processing capacity of the microcomputer.

SUMMARY OF THE INVENTION

Thus, in order to solve the above-described problem, it is an object of the present invention to shorten the startup time of an interrupt processing routine and improve processing efficiency in a pipeline processing device.

A pipeline processing device of a first embodiment devised to achieve this object is configured so first switching means renders data loaded from a memory at the memory access stage into input data of the memory access stage executed at a next processing timing in lieu of output data from the execution stage executed in parallel at the same processing timing as the memory access stage.

In this case, at the memory access stage executed after reception of an interrupt request, the first switching means may switch the output data of the execution stage when a header address of an interrupt processing routine to be executed in response to the interrupt request is loaded from the memory.

In the pipeline processing device of the embodiment configured in this manner, the data (header address of the interrupt processing routine) loaded at the memory access stage immediately becomes input data of the memory access stage executed at the next processing timing. Thus, at the next processing timing at which the header address is loaded, the loaded header address is set in the program counter and the fetching of the header instruction of the interrupt processing routine, i.e., the process of the interrupt processing routine can be immediately started.

In this manner, in the pipeline processing device of the embodiment, the startup time of the interrupt processing routine can be shortened by the amount of 1 stage in comparison to that of the conventional device where data loaded at the memory access stage is processed with the intervention of an instruction decode stage, and processing efficiency can be improved.

For this reason, the pipeline processing device of the embodiment can be suitable applied particularly as an arithmetic processing device of a microcomputer for controlling embedded devices in which interrupt requests frequently arise.

A pipeline processing device of a second embodiment is configured so that second switching means renders data loaded from a memory at the memory access stage into input data of the execution stage executed in parallel at the same processing timing as the memory access stage in lieu of output data from the instruction decode stage executed at an immediately prior processing timing.

In this case, at the memory access stage executed after reception of an interrupt request, the second switching means may switch the input data of the execution stage when data necessary to identify a header address of an interrupt processing routine to be executed in response to the interrupt request is loaded from the memory.

In the pipeline processing device of the embodiment configured in this manner, the data loaded at the memory access stage (data necessary to identify the header address of the interrupt processing routine) immediately becomes input data of the execution stage executed in parallel with the memory access stage, and the header address of the interrupt processing routine is determined at this execution stage.

As a result, at the next processing timing at which the memory access stage is executed, the header address determined at the execution stage is set in the program counter and the reading of the header instruction of the interrupt processing routine, i.e., the process of the interrupt processing routine can be immediately started.

In this manner, in the pipeline processing device of the embodiment, similar to the first embodiment, the startup time of the interrupt processing routine can be shortened by the amount of 1 stage in comparison to that of the conventional device, so that effects that are the same as those of the first embodiment can be obtained.

In an interrupt processing method, at the memory access stage executed after reception of an interrupt request, when a header address of an interrupt processing routine to be executed in response to the interrupt request or data necessary to identify the header address is loaded from a memory, a header instruction of the interrupt processing routine is fetched at a fetch stage executed at a next processing timing.

In other words, as described above, in comparison with the conventional device, the startup time of the interrupt processing routine can be shortened by the amount of 1 stage, so that effects that are the same as those of the first and second embodiments can be obtained.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS

Embodiments of the invention will be described below together with the drawings.

First Embodiment

Figure 1:
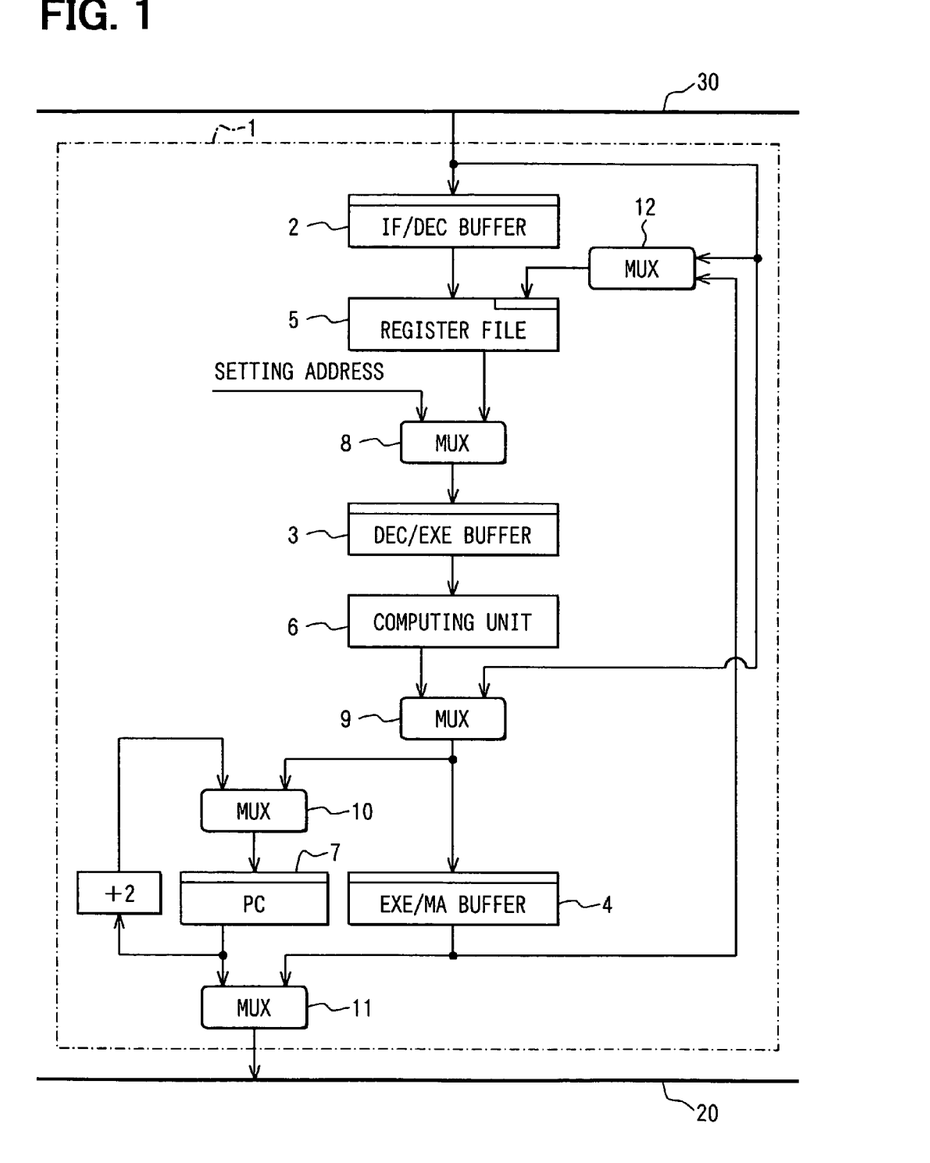
FIG. 1 is a block diagram showing the internal configuration of a CPU according to a first embodiment.

FIG. 1 is a block diagram showing the configuration of a data path portion of a CPU 1 serving as a pipeline processing device of a first embodiment to which the invention is applied. The CPU 1 of the present embodiment is disposed with an IF/DEC buffer 2, a DEC/EXE buffer 3, an EXE/MA buffer 4, a register file 5, a computing unit 6, a program counter 7 and multiplexers 10 to 12, which are configured in the same manner as the IF/DEC buffer 102, the DEC/EXE buffer 103, the EXE/MA buffer 104, the register file 105, the computing unit 106, the program counter 107 and the multiplexers 110 to 112 of the CPU 101 (conventional device).

The CPU 1 is also disposed, in lieu of the multiplexer 108, with a multiplexer 8 that selects any of output from the register file 5 or a ROM address (referred to below as "setting address") in which is stored information relating to a header address of an interrupt processing routine (referred to below as "interrupt address information") and provides this to the DEC/EXE buffer 3, and a multiplexer 9 serving as first switching means that selects any of output from the computing unit 6 and data loaded from an external memory via a data bus 30 and supplies this to the EXE/MA buffer 4 and the multiplexer 10.

It should be noted that, in the present embodiment, the interrupt address information represents the header address of the interrupt processing routine that is to be started.

Because the CPU 1 configured in this manner operates in the same manner as the conventional CPU 101 during normal processing, description thereof will be omitted. Here, an operation at the time of the startup of the interrupt processing routine will be described using the timing diagram shown in FIG. 2A.

Figure 2A:
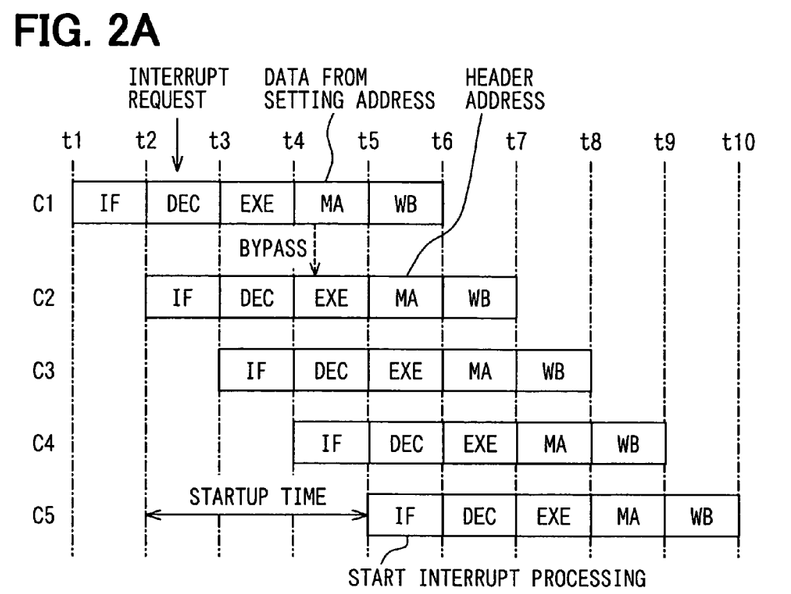
FIGS. 2A and 2B are timing diagrams of a pipeline operation pertaining to the startup process of an interrupt processing routine of a CPU according to first and second embodiments.

As shown in FIG. 2A, when an interrupt request is received at the stage beginning at a processing timing t2, the multiplexer 8 is switched to a setting that supplies the setting address to the DEC/EXE buffer 3 in lieu of data supplied from the register file 5.

Thus, at the DEC stage of an instruction processing cycle C1, the instruction fetched at the IF stage of a processing timing t1, i.e., the instruction that is being stored in the IF/DEC buffer 2 at that point in time is nullified, and the setting address is transmitted to the EXE stage (DEC/EXE buffer 3) instead of the decoding result of the instruction.

Next, at a processing timing t3, the setting address is stored in the DEC/EXE buffer 3, the computing unit 6 is set to allow the setting address stored in the DEC/EXE buffer 3 to pass without changing the value (specifically, zero may be added to the setting address or the logical product of the setting address and the data, all of whose bits are 1, may be determined), and the multiplexer 9 is set to select the output of the computing unit 6.

Thus, at the EXE stage of the instruction processing cycle C1, the setting address is transmitted to the MA stage (EXE/MA buffer 4) without the value being changed.

Next, at a processing timing t4, the setting address is stored in the EXE/MA buffer 4 and the multiplexer 11 is set to output the output of the EXE/MA buffer 4 to the address bus 20. Moreover, the multiplexer 9 is set to select the data loaded from the setting address of the memory via the data bus 30, and the multiplexer 10 is set to supply, to the program counter 7, the data selected by the multiplexer 9 instead of the updated output of the program counter 7.

Thus, at the MA stage of the instruction processing cycle C1, memory access to the setting address is executed, and the data loaded thereby, i.e., the header address of the interrupt processing routine is supplied to the program counter 7 via the multiplexers 9 and 10.

In other words, the header address of the interrupt processing routine loaded at the MA stage of the instruction processing cycle C1 is bypassed to the EXE stage of an instruction processing cycle C2.

Next, at a processing timing t5, the header address of the interrupt processing routine is stored in the program counter 7, the multiplexer 11 is set to output the output of the program counter 7 to the address bus 20, and the data (instruction) loaded from the header address via the data bus 30 is stored in the IF/DEC buffer 2.

Thus, the header address of the interrupt processing routine is set in the program counter 7 by the MA stage of the instruction processing cycle C2, and the fetching of the header instruction of the interrupt processing routine is immediately started (processed in an instruction processing cycle C5) in accordance with the setting value of the program counter 7.

As described in detail above, the CPU 1 of the present embodiment is configured so that when the header address of the interrupt processing routine is loaded from the ROM at the MA stage after reception of the interrupt request, the header address is bypassed to become input data of the MA stage executed at the next processing timing.

Thus, at the next processing timing at which the header address of the interrupt processing routine is loaded, the loaded header address is set in the program counter 7 and the fetching of the header instruction of the interrupt processing routine, i.e., the process of the interrupt processing routine can be immediately started.

In other words, according to the CPU 1 of the present embodiment, the startup time from when the interrupt request is received to when the interrupt processing routine is started can be shortened by the amount of 1 stage compared to that of the conventional device. Thus, the responsiveness of each interrupt and the processing efficiency of the overall CPU 1 can be improved. Processing efficiency can be significantly improved particularly in a case where the CPU 1 is applied to a system in which interrupt requests frequently arise.

Second Embodiment

Figure 3:
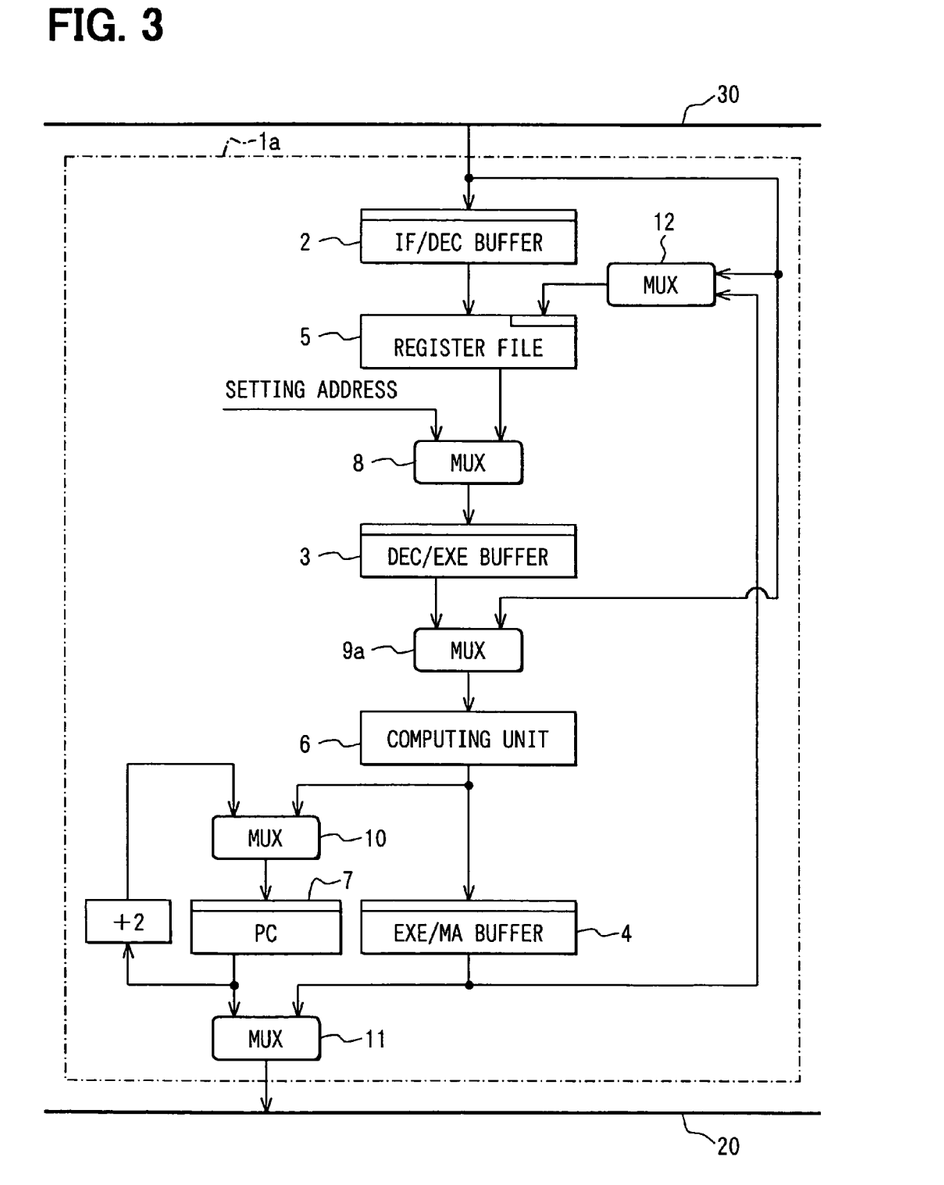
FIG. 3 is a block diagram showing the internal configuration of a CPU of a second embodiment.

FIG. 3 is a block diagram showing the internal configuration of a CPU 1*a* according to a second embodiment.

It should be noted that, because only part of the configuration of the CPU 1*a* of the present embodiment is different from that of the CPU 1 of the first embodiment, the same reference numerals will be used and description will be omitted with respect to parts having the same configuration, and the part of the configuration that is different will be described.

As shown in FIG. 3, the CPU 1*a* of the present embodiment is disposed, in place of the multiplexer 9, with a multiplexer 9*a* serving as second switching means that selects any of the output of the DEC/EXE buffer 3 and the data loaded via the data bus 30 and supplies this to the computing unit 6. Similar to the conventional device, the CPU 1*a* of the present embodiment is configured so that the output of the computing unit 6 is supplied as is to the EXE/MA buffer 4 and the multiplexer 10.

It should be noted that, in the present embodiment, the interrupt address information represents information (e.g., offset value) for identifying the header address of the interrupt processing routine that is to be started.

Figure 2B:
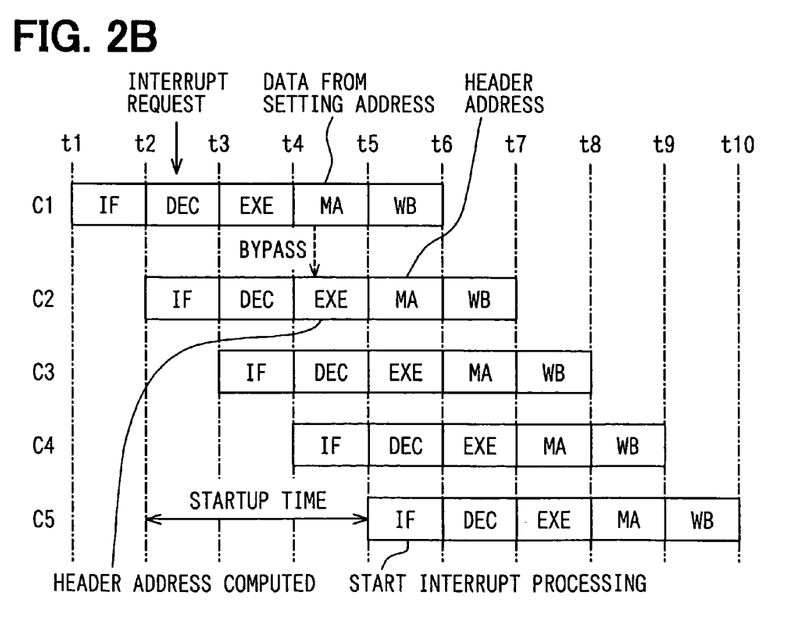

An operation when the interrupt processing routine in the CPU 1*a* configured in this manner is started will be described using the timing diagram shown in FIG. 2B. When an interrupt request is received at the stage beginning at the processing timing t2, the multiplexer 8 is switched to a setting that supplies the setting address to the DEC/EXE buffer 3 in lieu of data supplied from the register file 5.

Thus, at the DEC stage of the instruction processing cycle C1, the instruction fetched at the IF stage of the processing timing t1, i.e., the instruction that is being stored in the IF/DEC buffer 2 at that point in time is nullified, and the setting address is transmitted to the EXE stage (DEC/EXE buffer 3) instead of the decoding result of the instruction.

Next, at the processing timing t3, the setting address is stored in the DEC/EXE buffer 3, and the multiplexer 9*a* is set to select the output of the DEC/EXE buffer 3. Moreover, the computing unit 6 is set to allow the setting address supplied from the DEC/EXE buffer 3 via the multiplexer 9*a* to pass without changing the value (specifically, zero may be added to the setting address or the logical product of the setting address and the data, all of whose bits are 1, may be determined).

Thus, at the EXE stage of the instruction processing cycle C1, the setting address is transmitted to the MA stage (EXE/MA buffer 4) without the value being changed.

Next, at the processing timing t4, the setting address is stored in the EXE/MA buffer 4 and the multiplexer 11 is set to output the output of the EXE/MA buffer 4 to the address bus 20. Moreover, the multiplexer 9*a* is set to select the data loaded from the setting address of the memory via the data bus 30, and the multiplexer 10 is set to supply, to the program counter 7, the output data of the computing unit 6 instead of the updated output of the program counter 7.

Thus, at the MA stage of the instruction processing cycle C1, memory access to the setting address is executed, and the data loaded thereby (offset value for designating the header address of the interrupt processing routine) is supplied to the computing unit 6 via the multiplexer 9*a*. Moreover, on the basis of that data, the header address of the interrupt processing routine determined by the computing unit 6 is supplied to the program counter 7 via the multiplexer 10.

In other words, the data loaded at the MA stage of the instruction processing cycle C1 is bypassed to the EXE stage of the instruction processing cycle C2 executed in parallel at the same processing timing, and the header address of the interrupt processing routine computed at the EXE stage thereof is transmitted to the MA stage of the instruction processing cycle C2.

Next, at the processing timing t5, the header address of the interrupt processing routine is stored in the program counter 7, the multiplexer 11 is set to output the output of the program counter 7 to the address bus 20, and the data (instruction) loaded from the header address via the data bus 30 is stored in the IF/DEC buffer 2.

Thus, the header address of the interrupt processing routine is set in the program counter 7 by the MA stage of the instruction processing cycle C2, and the fetching of the header instruction of the interrupt processing routine is immediately started (processed in the instruction processing cycle C5) in accordance with the setting value of the program counter 7.

As described in detail above, the CPU 1*a* of the present embodiment is configured so that, at the MA stage, the data (offset value for designating the header address of the interrupt processing routine) loaded from the ROM is bypassed to the EXE stage executed in parallel with the MA stage to immediately determine the header address of the interrupt processing routine without waiting on the next processing timing.

Thus, at the next processing timing at which the offset value for designating the header address of the interrupt processing routine is loaded, the header address determined on the basis of the loaded offset value is set in the program counter 7 and the fetching of the header instruction of the interrupt processing routine, i.e., the process of the interrupt processing routine can be immediately started.

In other words, according to the CPU 1a of the present embodiment, even when the data loaded by the setting address is information (e.g., offset value) for identifying the header address and not the header address itself, the startup time from when the interrupt request is received to when the interrupt processing routine is started can be shortened by the amount of 1 stage compared to that of the conventional device. Thus, effects that are the same as those of the CPU 1 of the first embodiment can be obtained.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pipeline processing device that sequentially executes, per set processing timing, plural stages including at least instruction decode, execution and memory access to thereby process in parallel plural instruction processing cycles that respectively process one instruction, so that mutually different stages are concurrently executed, the pipeline processing device comprising:

a first multiplexer that selectively supplies one of output from a computing unit or data loaded from an external memory via a data bus to a buffer and a second multiplexer, wherein at the memory access stage executed after reception of an interrupt request, the first multiplexer replaces output data of an execution stage that is simultaneously executed in parallel at a timing of the memory access stage with a header address of an interrupt processing routine to be executed in response to the interrupt request, the header address being loaded from a memory for use as an input data for the memory access stage executed in a next processing timing.

2. A pipeline processing device that sequentially executes, per set processing timing, plural stages including at least instruction decode, execution and memory access to thereby process in parallel plural instruction processing cycles that respectively process one instruction, so that mutually different stages are concurrently executed, wherein the pipeline processing device comprises:

a multiplexer that selectively supplies one of output from a buffer or data loaded via a data bus to a computing unit, wherein at the memory access stage executed after reception of an interrupt request, the multiplexer replaces output data of the instruction decoding stage at an immediately preceding processing timing with data necessary to identify a header address of an interrupt processing routine to be executed in response to the interrupt request, the data being loaded from a memory for use as input data for the execution stage that is simultaneously executed in parallel at a timing of the memory access stage.

3. A method of accelerating processing after an interrupt request for a pipeline processing device that sequentially executes, per set processing timing, plural stages including at least instruction decode, execution and memory access to thereby process in parallel plural instruction processing cycles that respectively process one instruction, so that mutually different stages are concurrently executed, wherein at the memory access stage executed after reception of the interrupt request, when a header address of an interrupt processing routine to be executed in response to the interrupt request or data necessary to identify the header address is loaded from a memory, a header instruction of the interrupt processing routine is fetched at a fetch stage executed at a next processing timing.

4. A pipeline processing device for performing parallel plural instruction processing cycles, the pipeline processing device including a multiplexer for selectively outputting, when an interrupt request is received, a setting address associated with the interrupt request to a decode/execute buffer to be stored in the decode/execute buffer at an execution stage of a first cycle, the pipeline processing device further comprising:

a first switching means for selectively outputting at the execution stage of the first cycle the setting address received from the decode/execute buffer to a second switching means and to an execute/memory access buffer to thereby be stored in the execute/memory access buffer at a memory access stage of the first cycle, wherein the first switching means is further for selectively outputting a header address of an interrupt processing routine loaded from the setting address via a data bus to the execute/memory access buffer and to the second switching means at an execution stage of a second cycle, the header address for use as input data for a memory access stage executed in a next processing timing.

5. The pipeline processing device of claim 4, wherein the second switching means is for supplying to a program counter the header address loaded from the setting address or an updated output of the program counter, wherein the second switching means supplies the header address loaded from the setting address when the interrupt request is received.

* * * * *